United States Patent [19]

Nakano

[11] Patent Number: 5,745,468
[45] Date of Patent: Apr. 28, 1998

[54] MARK EDGE RECORDED SIGNAL REPRODUCING DEVICE FOR USE IN OPTICAL DISK APPARATUS

[75] Inventor: Junichi Nakano, Hino, Japan

[73] Assignee: Olympus Optical Co., Ltd., Tokyo, Japan

[21] Appl. No.: 579,149

[22] Filed: Dec. 27, 1995

[30] Foreign Application Priority Data

Jan. 11, 1995 [JP] Japan ..................... 7-002797

[51] Int. Cl.$^6$ ................... G11B 7/00; G11B 5/09
[52] U.S. Cl. ................... 369/124; 369/59; 369/48
[58] Field of Search .................... 369/47, 48, 49, 369/59, 60, 124; 360/32, 51

[56] References Cited

U.S. PATENT DOCUMENTS 5,598,392  1/1997  Izumi et al. .................... 369/48 X

FOREIGN PATENT DOCUMENTS 2-183471  7/1990  Japan.
6-150578  5/1994  Japan.

OTHER PUBLICATIONS

MAG-92-191, Institute of Electrical Engineers of Japan, Meeting for Study of Magnetics, Increase in density of a magneto-optical disk by partial response using Viterbi decording p. 1 (Abstract), and 77–82 (No Translation).

*Primary Examiner*—Paul W. Huber
*Attorney, Agent, or Firm*—Armstrong, Westerman, Hattori, McLeland & Naughton

[57] ABSTRACT

A signal reproducing device for use in an optical disk apparatus adapted to irradiate an optical disk with light beams and detect a reproduction signal associated with a mark formed on the optical disk from light beams reflected by the optical disk and reproduce data recorded thereon on the basis of the reproduction signal. This signal reproducing device is provided with a first clock generating unit for generating a first clock corresponding to a leading edge of the mark, a second clock generating unit for generating a second clock corresponding to a trailing edge of the mark, a first sampling unit for sampling the reproduction signal according to the first clock, a second sampling unit for sampling the reproduction signal according to the second clock and a selection unit for selecting one of outputs of the first and second sampling unit. Thereby, reproduction signals can be sampled with optimum timing at all times.

18 Claims, 9 Drawing Sheets

D20, D11, D22, D23, D24, D25, D16, D27, D28, D29 ····

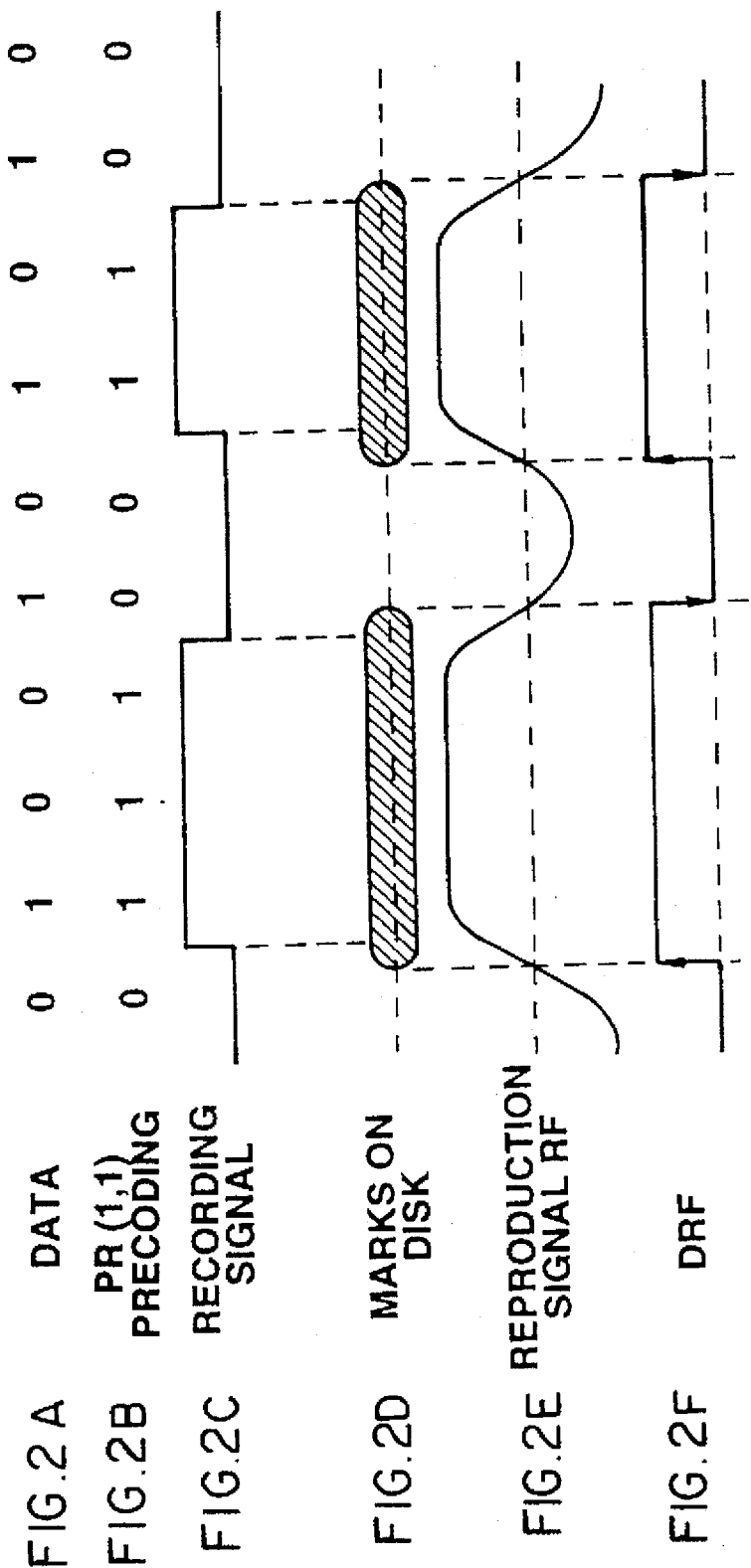

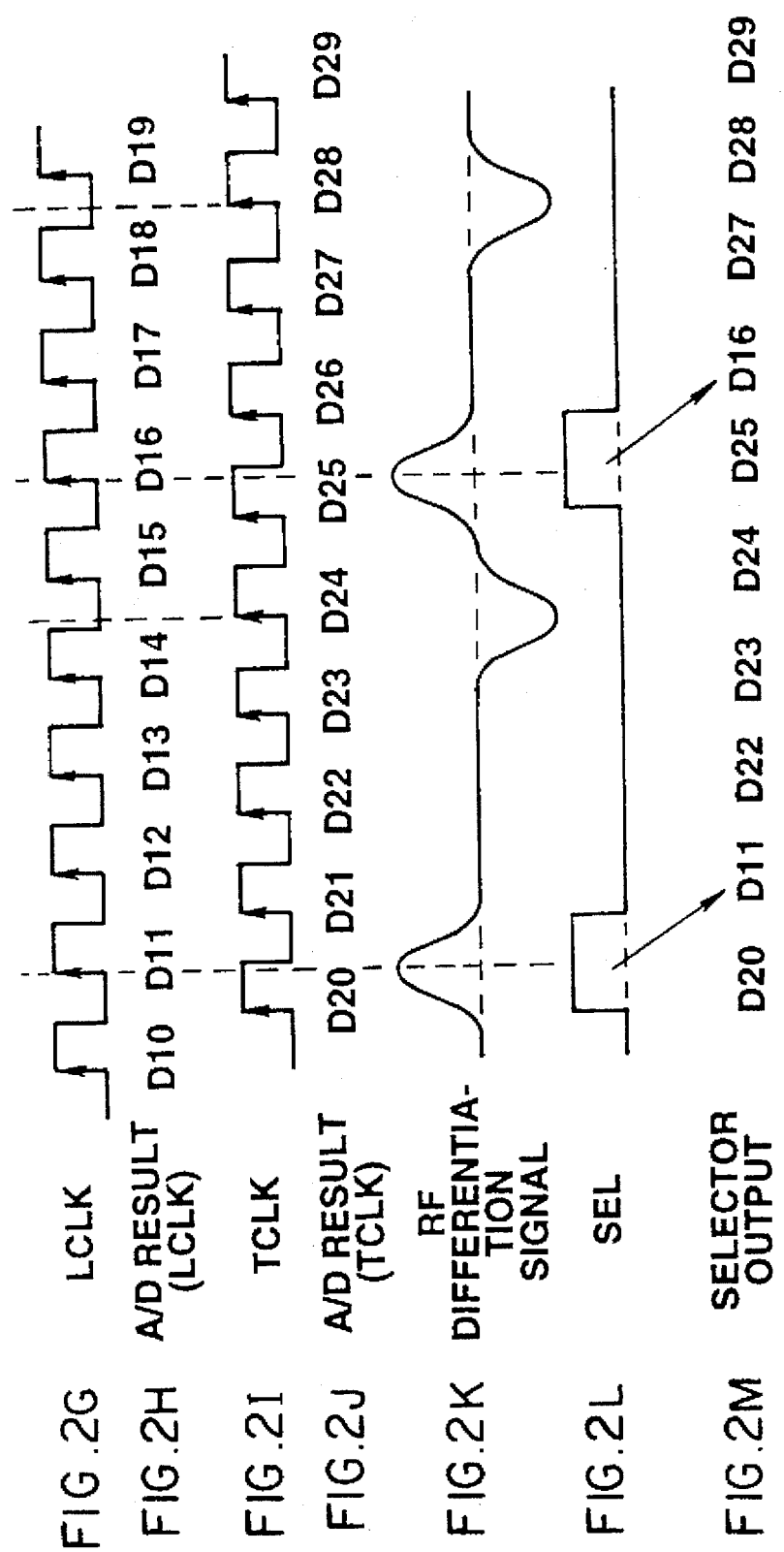

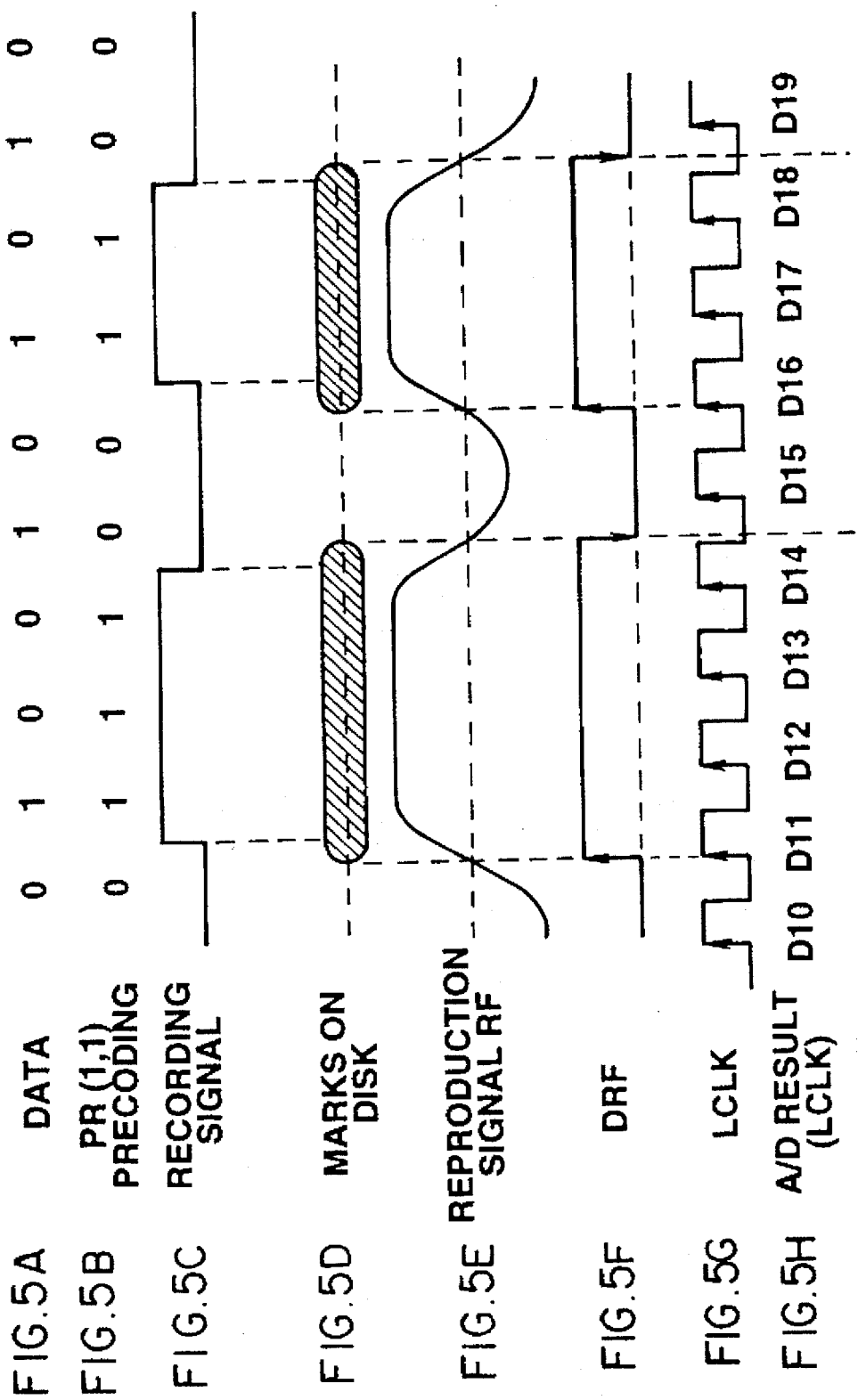

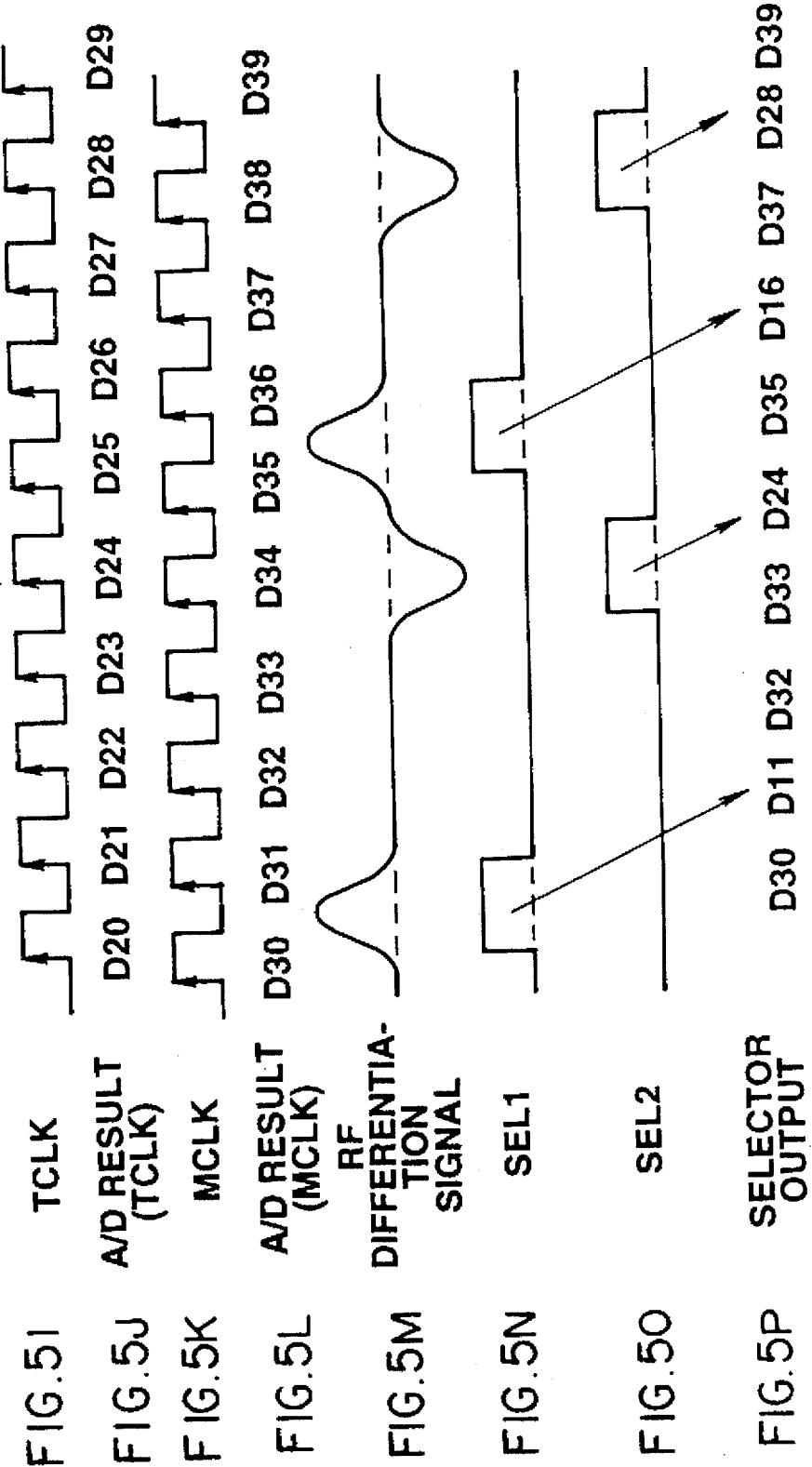

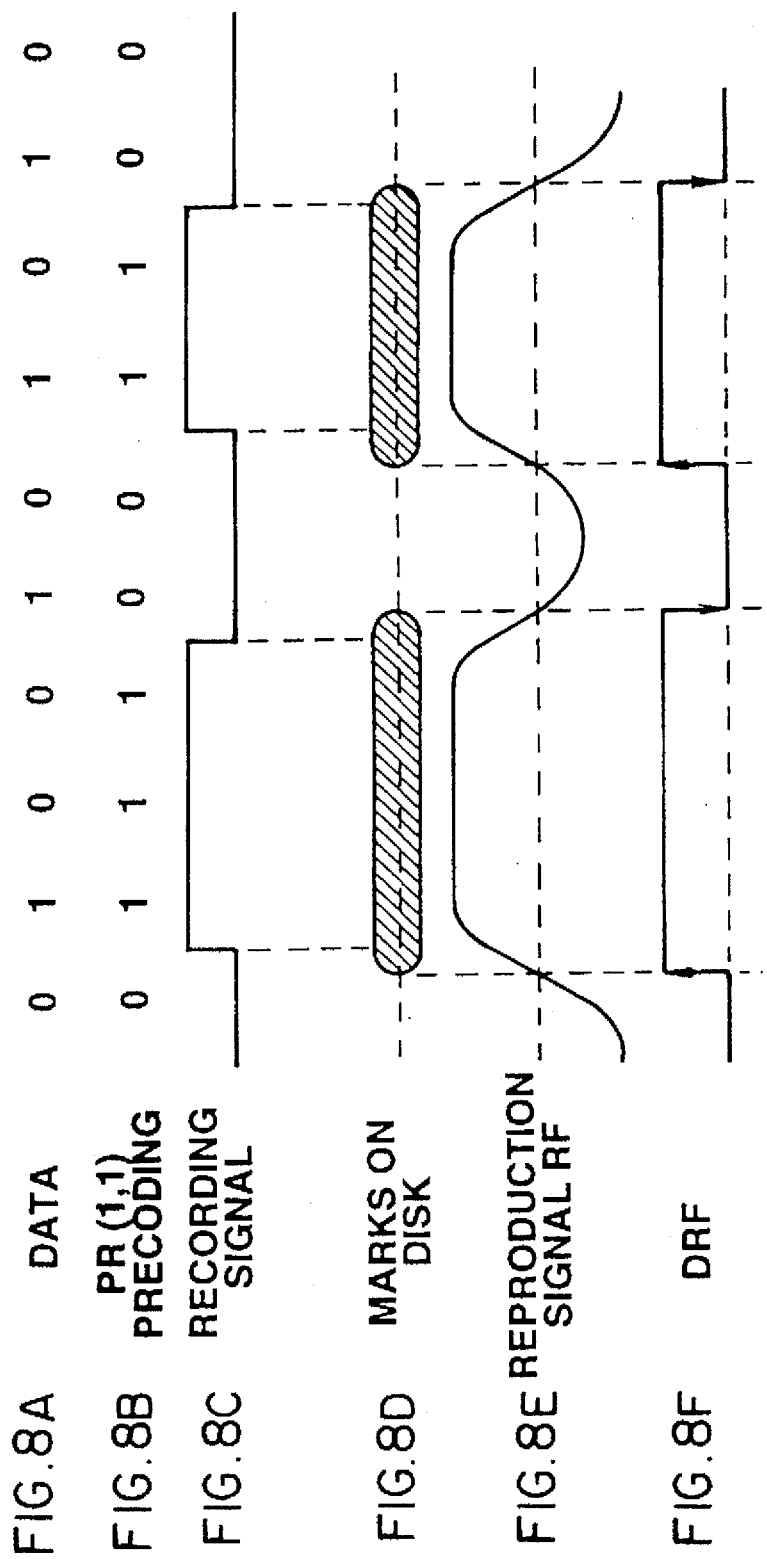

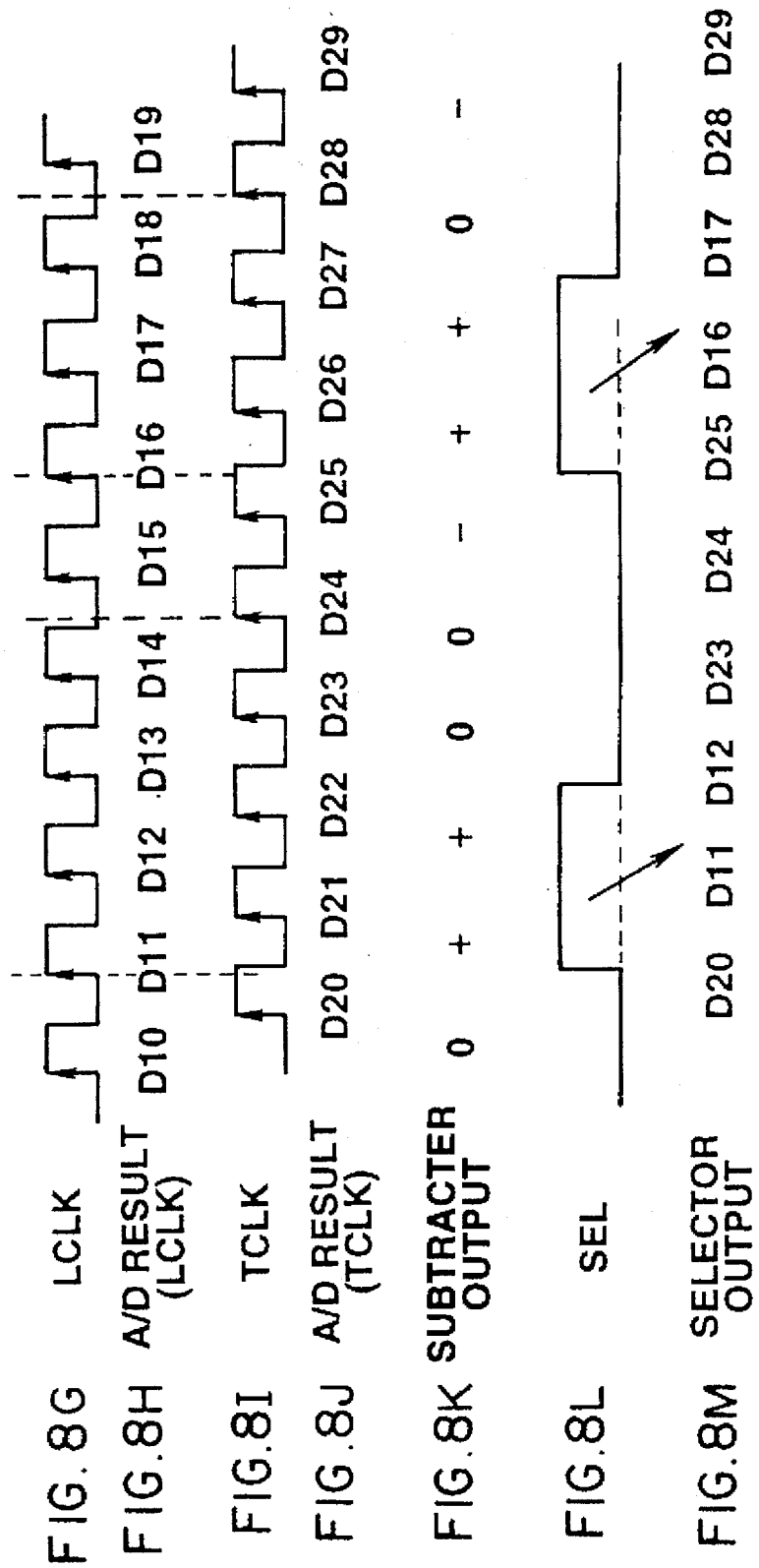

MARK EDGE RECORDED SIGNAL REPRODUCING DEVICE FOR USE IN OPTICAL DISK APPARATUS

BACKGROUND OF THE INVENTION

1. Field of the Invention

The present invention relates to a signal reproducing device for use in an optical disk apparatus for performing high-density recording and reproducing.

2. Description of the Related Art

In recent years, attention has been focused on what is called a partial response maximum likelihood (PRML) method as a method of realizing a high-density disk for use in an optical disk system. This PRML method is the combination of a partial response (PR) method and a maximum likelihood (ML) decoding method. Further, even in the case that the bandwidth of a signal reproducing system of the optical disk apparatus is narrow and the optical disk apparatus is in a high noise situation, low-error signal reproduction can be realized by this PRML method. Consequently, the PRML method has the merit of increasing the track recording density at which an optical disk is to be read and written.

The PRML method is reviewed in detail in, for instance, "Increase in density of a magneto-optical disk by partial response using Viterbi decoding", *Institute of Electrical Engineers of Japan, Meeting for Study of Magnetics*, MAG-92-191. A method of reproducing data according to the ML method is that of selecting and detecting a data sequence having a maximum likelihood according to information concerning the transition states of reproduction (RF) signals (namely, concerning the correlation in the direction of time-axis therebetween) and has been variously studied as a method for increasing the density by a signal processing. Although there are several methods for the ML decoding, the Viterbi decoding method is frequently used.

Meanwhile, a method, by which data is recorded by performing light modulation on a magneto-optical disk or a phase change disk, has a drawback in that sometimes, a mark having a correct length cannot be formed on the disk owing to variation in the output power of a laser or in an ambient temperature. This drawback is insignificant in the case of performing what is called a mark position recording, in which the position (namely, the presence or absence) of a mark corresponds to data "1". In contrast, in the case of performing what is called a mark edge recording, in which an edge of a mark corresponds to data "1", this drawback results in variation in the position at which data is recorded. Consequently, in this case, a margin at the time of decoding becomes small.

As a method for compensating this drawback, for example, the Japanese Patent Laying-open No. 2-183471/1990 Official Gazette discloses a method of distinguishing a leading edge (or a leading edge portion) and a trailing edge (or a trailing edge portion) of a mark, which is formed on a disk, independently of each other by using two sequences of clocks respectively corresponding to the leading edge and the trailing edge, and subsequently synthesizing signals from pulses sent from the leading and trailing edges of marks and then performing a decoding on such signals.

In the case of recording (or writing) data by performing a light modulation method when recording and reproducing at a high density by using the PRML method, a problem or trouble is caused if a mark having a correct length cannot be formed. This is because the level of a reproduction signal varies in the proximity of an edge of a mark at the time of reproducing data. The method disclosed in the Japanese Patent Laying-open No. 2-183471/1990 Official Gazette, however, cannot be applied to cases that use what is called a bit-by-bit decoding method, by which each occurrence of the zero-crossing by a reproduction signal is regarded as indicating the presence of data "1".

Thus, in the Japanese Patent Laying-open No. 6-150578/1994 Official Gazette, there has been proposed a method of providing a reference area in each of specific regions on a disk (in the ratio of one reference area in every sector) and further recording a specific pattern preliminarily in the reference area and then detecting a variation in mark length from the level of a reproduction signal at the time when data is reproduced, and thereafter compensating when the ML decoding is performed.

The method described in the Japanese Patent Laying-open No. 6-150578/1994 Official Gazette, however, is to compensate for a variation in mark length, which originates from the incorrect timing of data recording, by regulating the level of a reproduction signal. It is thus difficult to completely eliminate the influence of the variation in mark length in a final stage, and to secure a margin at the time of decoding.

Further, in the case of this method, the compensation can be achieved only at the frequency of presence of the reference area. In the case of an actual disk, the amount of variation in mark length changes owing to the unevenness in sensitivity even in a same sector. Thus, if a correction is performed in a reference area, the variation in the mark length sometimes changes halfway through the sector, so that the variation in the level of a reproduction signal remains and a margin cannot be secured at the time of decoding. An occurrence of this situation can be prevented by increasing the number of the reference areas. This method, however, has encountered a problem that when increasing the number of the reference areas, a recording area which a user can use is reduced.

SUMMARY OF THE INVENTION

Accordingly, an object of the present invention is to provide a signal reproducing device which can use two independent sequences of clocks corresponding to a leading edge and a trailing edge of a mark in the case of performing the light-modulation PRML method, and which can realize a large capacity optical disk apparatus at a low cost by combining the light modulation method, by which the configuration of the apparatus can be simplified, with the PRML method, by which data can be recorded and reproduced at a high density, without trading off recording area which a user can use.

Further, another object of the present invention is to provide a signal reproducing device which can obtain a result of an accurate sampling at edge portions of a mark formed on a disk by performing a sampling with optimum timing through the use of clocks, whose phases are matched with those of pulses sent from leading and trailing edges of a mark on the disk, even when the positions of the edges of the mark change owing to variation in the mark length, and can secure a large margin upon decoding later and thus can achieve a high-density recording and reproducing by utilizing such a margin.

Moreover, still another object of the present invention is to provide a signal reproducing device that can obtain a result of a sampling at portions of a mark other than edges thereof with optimum timing by further using a clock, whose phase is intermediate between phases of other clocks, which are respectively matched with those of pulses sent from leading and trailing edges of a mark on the disk, and can increase the magnitude of a margin at the time of decoding by using the clock having such an intermediate phase at that time and thus can record and reproduce data at a high density.

To achieve the foregoing objects, in accordance with an aspect of the present invention, there is provided a signal reproducing device for use in an optical disk apparatus adapted to irradiate an optical disk with light beams and detect a reproduction signal associated with a mark formed on the optical disk from light beams reflected by the optical disk and reproduce data recorded thereon on the basis of the reproduction signal, which comprises: first clock generating means for generating a first clock corresponding to a leading edge of the mark; second clock generating means for generating a second clock corresponding to a trailing edge of the mark; first sampling means for sampling the reproduction signal according to the first clock; second sampling means for sampling the reproduction signal according to the second clock; and selection means for selecting one of outputs of the first and second sampling means.

Other features, objects and advantages of the present invention will become apparent from the following description of preferred embodiments with reference to the drawings in which like reference characters designate like or corresponding parts throughout several views.

BRIEF DESCRIPTION OF THE DRAWINGS

FIG. 2 is a timing chart for illustrating an operation of the signal reproducing device, namely, the first embodiment of the present invention;

FIG. 5 is a timing chart for illustrating an operation of the second signal reproducing device, namely, the second embodiment of the present invention;

FIG. 8 is a timing chart for illustrating an operation of the fourth signal reproducing device, namely, the fourth embodiment of the present invention.

DETAILED DESCRIPTION OF THE PREFERRED EMBODIMENTS

Figure 1:
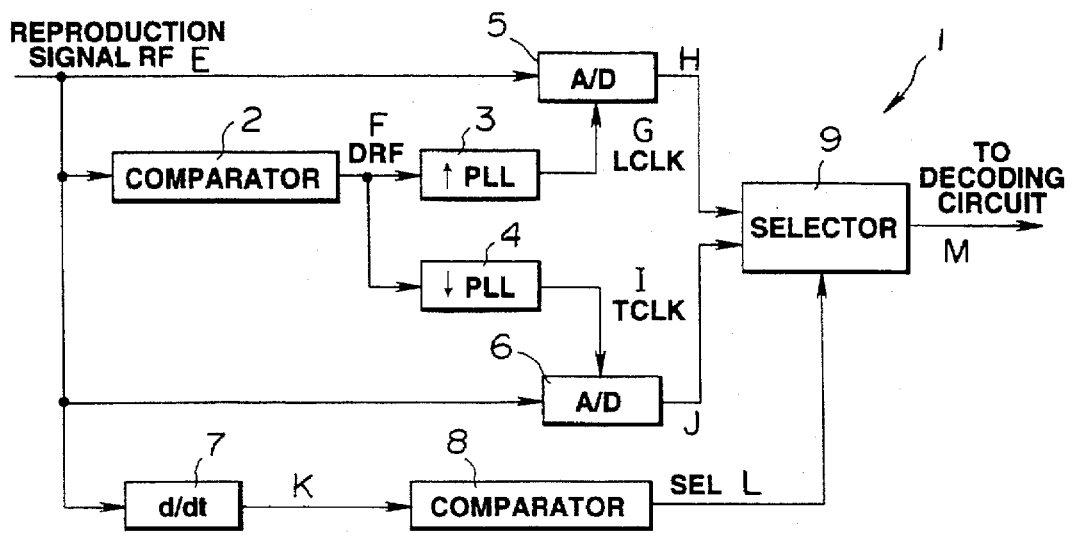
FIG. 1 is a block diagram for illustrating the configuration of a signal reproducing device embodying the present invention, namely, a first embodiment of the present invention.
Figure 3:
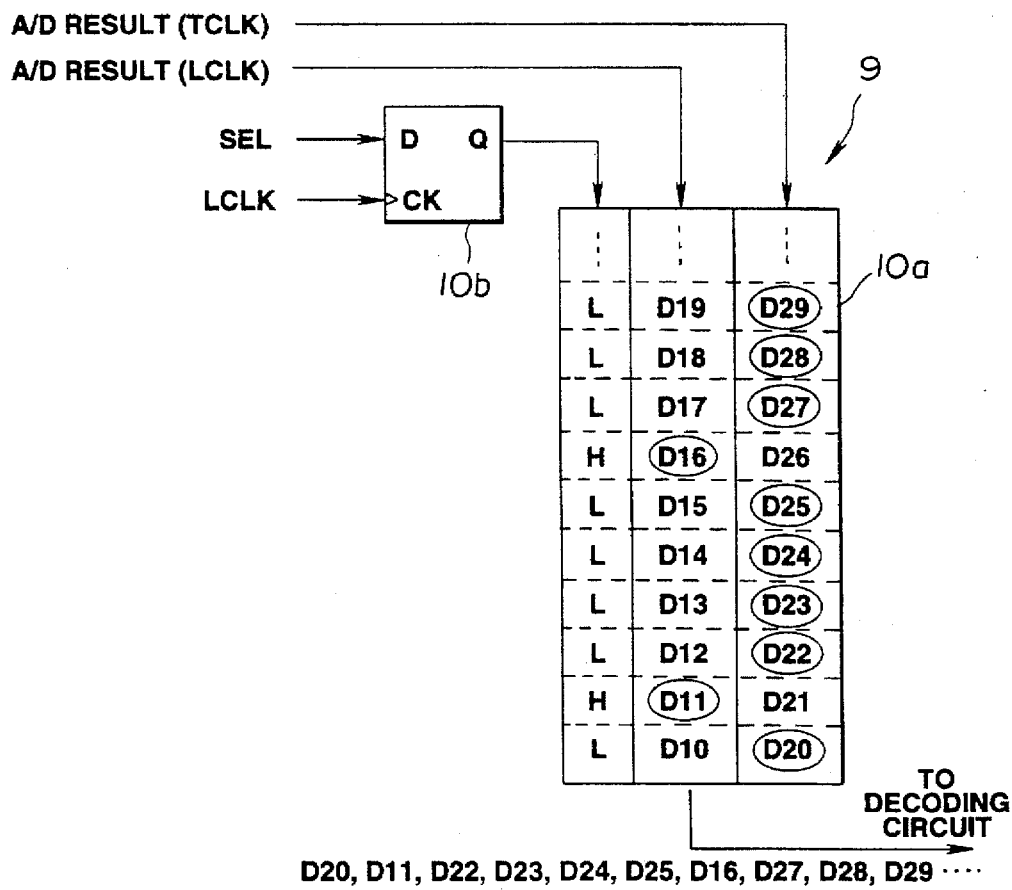
FIG. 3 is a diagram for illustrating the configuration and operation of a selector provided in the signal reproducing device.

FIGS. 1 to 3 illustrate the first embodiment of the present invention.

This embodiment is an example of a signal reproducing device to be provided in an optical disk apparatus for reproducing data by using the PRML method obtained by the combination of the PR method and the ML decoding method. As a result of employing the PR method and the ML decoding method, the recording and reproducing of data can be achieved at a further higher density.

A signal reproducing device 1 consists of a first comparator 2 for performing binarization of a reproduction signal, a first phase-locked loop (PLL) circuit 3 serving as first clock generating means for generating a clock (LCLK) in synchronization with a leading edge of an output of the comparator 2, a second PLL circuit 4 serving as second clock generating means for generating a clock (TCLK) in synchronization with a trailing edge of an output of the comparator 2, a first analog-to-digital (A/D) converter 5 serving as first sampling means for performing an A/D conversion on the reproduction signal by using a clock generated by the first PLL circuit 3, a second A/D converter 6 serving as second sampling means for performing an A/D conversion on the reproduction signal by using a clock generated by the second PLL circuit 4, a differentiating circuit 7 for differentiating the reproduction signal, a second comparator 8 for performing binarization of an output of the differentiating circuit 7 and a selector 9 serving as selection means for selecting one of an output of the first A/D converter 5 and an output of the second A/D converter 6 according to an output of the second comparator 8.

An operation of this embodiment, namely, the signal reproducing device 1 of the present invention will be described hereinbelow by referring to FIG. 2.

Here, it is assumed that original data to be recorded on a disk is data A illustrated in FIG. 2 and that in such a case, a PR(1,1) preceding is used in performing the PR method for recording and reproducing data. Incidentally, reference characters A, B, ... M designating signals in FIG. 1 correspond to operating waveforms or the like A to M of FIG. 2, respectively.

A signal representing the original data is first modulated by a precoder having a characteristic reverse to that of PR(1,1). As a result, data B of FIG. 2 is obtained. Practically, the PR(1,1) preceding is to calculate the exclusive OR of a current data bit and a data bit obtained just after the preceding preceding, namely, a non-return-to-zero-inverted (NRZI) conversion. Thus, bits of the original data are serially checked, and each time when a bit set to "1" is found in the original data, the succeeding bits are inverted from "0" to "1" or from "0" to "1" in the precoded data, namely, the data obtained by the preceding.

Data is written to an optical disk in such a manner that a mark is formed on a portion thereof corresponding to one or more bits set to "1" in the precoded data. Thus a write or recording signal has the waveform C as illustrated in FIG. 2. As compared with the original data A of FIG. 2, edges of the marks correspond to the bits set to 1 in the original data.

According to this recording signal, the data is written to the disk. Here, it is now assumed that a mark D, which is a little longer than as intended, as illustrated in FIG. 2 is formed on the disk. The formation of such a mark is liable to occur in the cases that an ambient temperature is high, that the disk has high sensitivity and that the laser has a high output upon recording data.

When the data is reproduced by irradiating such a mark with laser light, a reproduction RF signal E of FIG. 2 is obtained. The binarization of this reproduction signal is performed in the comparator 2 by using a predetermined value (for example, a zero level) as a threshold value, so that a binary signal DRF having the waveform F of FIG. 2 is obtained. Then, a clock G (LCLK) synchronized with a leading or rising edge of this binary signal DRF is generated by the PLL circuit 3 as illustrated in FIG. 2. On the other hand, another clock I (TCLK) synchronized with a trailing or falling edge of the signal DRF is generated by the PLL circuit 4 as shown in FIG. 2. These clocks are supplied to the A/D converters 5 and 6, respectively.

The A/D converters 5 and 6 perform the sampling of the reproduction signal RF having the waveform E of FIG. 2 according to the clocks supplied thereto. The timing of the sampling is determined according to the clock LCLK or TCLK as being in synchronization with the leading edge or the trailing edge of the reproduction signal. Further, it is assumed that as a result of sampling the signal RF by the A/D converter 5 in synchronization with the clock LCLK, pulses D10 to D19 (see H of FIG. 2) are obtained, and that as a result of sampling the signal RF by the A/D converter 6 in synchronization with the clock TCLK, pulses D20 to D29 (see J of FIG. 2) are obtained. Practically, the A/D conversions are performed in the A/D converters 5 and 6 by using data consisting of 6 to 8 bits.

On the other hand, the reproduction signal RF is differentiated by the differentiating circuit 7. Consequently, a differentiated signal having the waveform K of FIG. 2 is obtained. Then, the binarization of the signal having this waveform is performed in the comparator 8 by using a predetermined value (for instance, a zero level) as a threshold value. Thus an output signal SEL of the comparator 8, which has an output level "H" when the differentiated signal has a positive level (see L of FIG. 2), is obtained.

Subsequently, the selector 9 selects one of two pulse sequences H and J of FIG. 2, which have been obtained as results of the A/D conversions, according to the output signal SEL of the comparator 8. This selection is performed in order to choose the result of the A/D conversion carried out by sampling the signal RF at the edge portions of the mark with more accurate timing and pass the chosen result to a decoding circuit such as a Viterbi decoding circuit (not shown) of the subsequent stage. It is preferable that the result (see H of FIG. 2) of the sampling of the signal RF in synchronization with the leading edge of the mark according to the clock LCLK is selected when the sampling should be performed in the vicinity of the leading edge thereof, and that the result (see J of FIG. 2) of the sampling of the signal RF in synchronization with the trailing edge of the mark according to the clock TCLK is selected when the sampling should be performed in the vicinity of the trailing edge thereof. In other portions on the disk, namely, in portions apart from the edges of the mark, in which the reproduction signal has flat waveform, either may be selected.

In the case of this embodiment, the output signal SEL of the comparator 8 at the rising edge of the clock LCLK (see G of FIG. 2) synchronized with the leading edge of the mark is referred to. Further, it is assumed that when the output signal SEL has the level "H", the result of the A/D conversion by performing the sampling according to the clock LCLK is selected, and that when the output signal SEL has the level "L", the result of the A/D conversion by performing the sampling according to the clock TCLK is selected. Thus, the selector 9 outputs a signal representing data M of FIG. 2. Namely, this signal is outputted therefrom as representing the result of the A/D conversion.

The selector 9 is provided with, for example, a flip-flop 10b for outputting the signal SEL, which is outputted by the comparator 8 at the rising edge of the clock LCLK, and registers 10a for storing the two pulse sequences respectively obtained according to the clocks LCLK and TCLK therein and the output signal SEL of the comparator 8, which are obtained at the rising edge of the clock LCLK, simultaneously, as illustrated in FIG. 3. The selector 9 first stores the two results of the A/D conversions obtained by the A/D converters 5 and 6 and the output signal SEL of the comparator 8 in the registers 10a, respectively, and thereafter takes one of the results of the A/D conversions, which is encircled in this figure, from the corresponding one of the registers by referring to a value represented by the signal SEL.

In this way, the result of the A/D conversion selected by the selector 9 is sent to the decoding circuit (not shown) of the subsequent stage and a maximum likelihood decoding such as the Viterbi decoding is performed in the decoding circuit.

In the case of this embodiment, the sampling of the reproduction is performed at the leading and trailing edges of a mark independently of each other by using clocks whose phases are matched with those of pulses sent from the leading and trailing edges of the mark, respectively. Further, a signal is synthesized from signals representing results of these sampling operations, and then the synthesized signal is sent to the decoding circuit. Thereby, the ML decoding can be performed in the decoding circuit. A kind of an error correction can be achieved by performing the ML decoding. Consequently, the device comes to be capable of recording and reproducing data at a higher density.

Namely, even when the length of a mark on the disk changes and thus the positions of the edges of the mark changes, the sampling of the reproduction signal is performed with optimum timing by using clocks, whose phases are matched with those of pulses sent from the leading and trailing edges. Thus a result of the accurate sampling at the edge portions of the mark can be obtained. Thereby, a margin at the time of decoding data later becomes large. Consequently, data can be recorded and reproduced at a high density by utilizing this margin. Moreover, the leading edge of the mark can be correctly distinguished from the trailing edge thereof by detecting a signal, which becomes maximal or minimal, and selecting one of a plurality of results of the sampling, which is used for decoding, on the basis of the detected signal. In this case, clocks synchronized with the respective edges of the mark can be generated at all times by generating clocks to be used for the sampling of data with the timing correspondingly to (namely, at moments synchronized with) the leading and trailing edges detected by performing the binarization of the reproduction signal.

As described above, in the case of this embodiment, A/D conversions are performed with timing suitable for the leading and trailing edges of a mark by using clocks synchronized with the leading and trailing edges thereof, respectively. Further, one of results of the A/D conversions is selected according to the result of the binarization of the differentiation signal obtained by differentiating the reproduction signal and is outputted to the decoding circuit. Thus the result of the A/D conversion passed to the decoding circuit is obtained by sampling the reproduction signal or waveform with optimum timing at all times. Consequently, a margin at the time of performing the ML decoding this embodiment becomes large. This embodiment, therefore, has an advantage in that the device can record and reproduce data at a higher density. Moreover, as the margin at the time of decoding data becomes large, the permissible variation in mark length increases at the time of recording the data. Thus, this embodiment further has advantages in that the configuration of the recording system can be simplified and the manufacturing cost of the device can be reduced.

Figure 4:
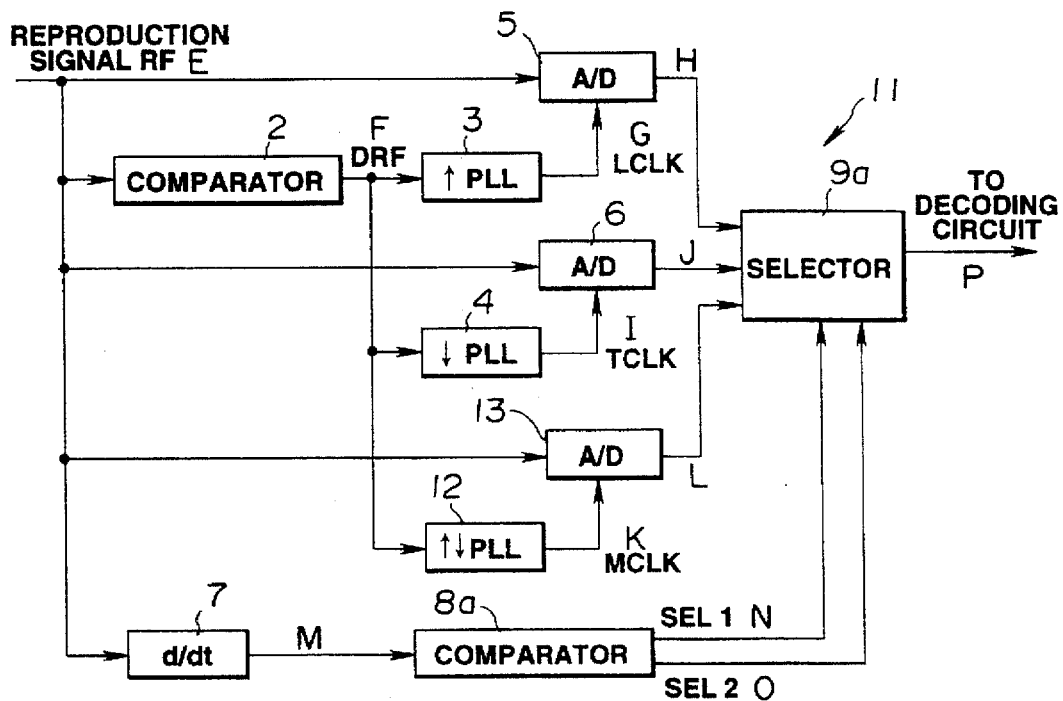
FIG. 4 is a block diagram for illustrating the configuration of a second signal reproducing device embodying the present invention, namely, a second embodiment of the present invention.

Next, a second embodiment of the present invention will be described by referring to FIGS. 4 and 5.

As above stated, two clocks, whose phases are matched with those of pulses sent from the leading and trailing edges of a mark, are used in the case of the first embodiment. In addition to the two clocks, a clock having a phase, which is intermediate between those of the two clocks, is further used in the case of the second embodiment.

A signal reproducing device 11 of the second embodiment further has a third PLL circuit 12 and a third A/D converter 13, which are provided in parallel with the PLL circuits 3 and 4 and the A/D converters 5 and 6, respectively, in addition to the composing elements of the signal reproducing device of the first embodiment of FIG. 1. Moreover, a comparator 8a and a selector 9a, which are respectively adapted to operate differently from the comparator 8 and the selector 9, are provided in the signal reproducing device 11. Incidentally, in FIG. 4, same reference characters designate same composing elements of the first embodiment of FIG. 1.

Hereinafter, an operation of the signal reproducing device 11 of the second embodiment will be described by referring to FIG. 5. This figure illustrates an operation thereof in the case that original data to be recorded is the same as used in the first embodiment. Thus, the description of steps, which are common to the operations of the first and second embodiments, is omitted for simplicity of description.

Similarly as in the case of the first embodiment, a sequence G of clock pulses LCLK of FIG. 5 and another sequence I of clock pulses TCLK of FIG. 5 are generated by the PLL circuits 3 and 4, respectively. Further, resultant pulse sequences H and J of FIG. 5 of the A/D conversions based on these clocks are obtained by the A/D converters 5 and 6.

Simultaneously with this, the third PLL circuit 12 receives both of the leading and trailing edges of an output signal DRF of the comparator 2, which performs the binarization of the reproduction signal, and generates a clock MCLK having a phase which is intermediate between the phase of the clock LCLK synchronized with the leading edge of a signal K of FIG. 5 and that of the clock TCLK synchronized with the trailing edge of the signal K of FIG. 5. This clock MCLK is inputted to the third A/D converter 13 which performs the sampling of the reproduction signal RF according to this clock. Resultant signals of the A/D conversion performed in synchronization with this clock MCLK are a sequence L of pulses D30 to D39 of FIG. 5.

On the other hand, the comparator 8a consists of two units placed in parallel with each other. One of the units is operative to receive the differentiation signal M of FIG. 5 obtained by differentiating the reproduction signal RF and to output a signal, whose level becomes "H" when the level of the differentiation signal is positive. The other unit is operative to also receive the differentiation signal M of FIG. 5 obtained by differentiating the reproduction signal RF and to output a signal, whose level becomes "H" when the level of the differentiation signal is negative. Thus a signal SEL1 having the waveform N of FIG. 5 and another signal SEL2 having the waveform O of FIG. 5 are obtained as output signals of the comparator 8a.

The selector 9a selects one of outputs of the A/D converters 5, 6 and 13 according to the two output signals SEL1 and SEL2 of the comparator 8a. A result of the A/D conversion obtained by performing the sampling of the reproduction signal with optimum timing can be selected by choosing the output of the A/D converter 5 when the sampling is performed in the proximity of the leading edge of a mark, and by choosing the output of the A/D converter 13 when the sampling is performed in the vicinity of the trailing edge of the mark.

Therefore, in the case of this embodiment, if the output signal SEL1 of the comparator 8a has the level "H" correspondingly to the leading edge of the clock LCLK having the waveform G of FIG. 5 synchronized with the leading edge of a mark, an output of the A/D converter 5 is selected. Further, if the output signal SEL2 of the comparator 8a has the level "H" correspondingly to the leading edge of the clock TCLK having the waveform I of FIG. 5 synchronized with the trailing edge of the mark, an output of the A/D converter 6 is selected. Otherwise, an output of the A/D converter 13 is selected. Thus, outputs P of the selector 9a are obtained as illustrated in FIG. 5.

Furthermore, similarly as in the case of the first embodiment, the result of the A/D conversion, which has been selected by the selector 9a, is sent to the decoding circuit of the subsequent stage (not shown), whereupon the decoding thereof is performed.

Namely, in the case of this embodiment, the sampling is performed by using a clock having a phase which is intermediate between the phase of the clock, whose phase is adjusted to or synchronized with that of a pulse sent from the leading edge of a mark, and that of the clock, whose phase is adjusted to or synchronized with that of a pulse sent from the trailing edge thereof. Thereby, in the case that the sampling is performed in a portion of a mark other than edge portions thereof, a result of the sampling performed with optimum timing can be used when decoding data. Thus, the margin at the time of decoding can be further increased. Consequently, data can be recorded and reproduced at a high density.

As above described, in the case of this embodiment, a clock having a phase which is intermediate between the phase of the clock, whose phase is adjusted to or synchronized with that of a pulse sent from the leading edge of a mark, and that of the clock, whose phase is adjusted to or synchronized with that of a pulse sent from the trailing edge thereof, is generated. Further, in the case that the sampling is performed in a portion of a mark other than edge portions thereof, a result of the sampling performed according to this clock having the intermediate phase is selected and outputted to the decoding circuit to perform the decoding thereof. Thus this embodiment has advantages in that the timing of the sampling of the reproduction signal can be closer to the optimum timing, in comparison with that of the sampling performed in the first embodiment and that the margin at the time of decoding increases and the recording and reproducing of data can be performed at a higher density.

Figure 6:
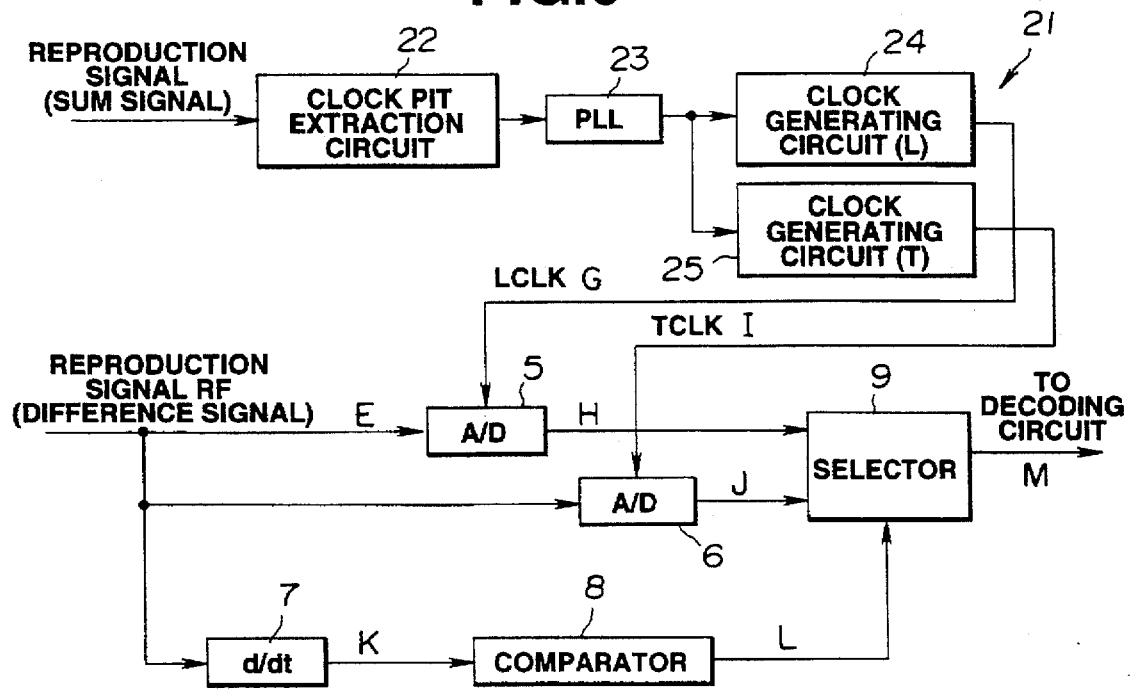
FIG. 6 is a block diagram for illustrating the configuration of a third signal reproducing device embodying the present invention, namely, a third embodiment of the present invention.

Next, a third embodiment of the present invention will be described by referring to FIG. 6.

In the case of each of the aforementioned embodiments, the present invention is applied to cases of employing a continuous servo format for an optical disk (incidentally, the continuous servo format method is to perform a tracking through the use of a guide groove and then extract clocks, which are used when reproducing data, from data itself recorded on the disk. The present invention, however, can be applied to cases of employing a sampled-servo format. An embodiment in such a case will be described hereunder as the third embodiment. The sampled-servo format method is to reproduce a channel clock in a PLL on the basis of a specific pit formed on the disk, which is called "clock pit", and perform all operations such as recording and reproducing operations according to this channel clock.

A signal reproducing device 21 of the third embodiment consists of a clock pit extraction circuit 22 for extracting a portion, which corresponds to a clock pit formed on the disk, from a reproduction signal, a PLL circuit 23 for reproducing a channel clock from pulses sent from the extracted clock pit, a first clock generating circuit 24 for generating a clock LCLK, whose phase is adjusted to or synchronized with that of the rising or leading edge of the reproduction signal, according to the channel clock generated by the PLL circuit 23, and a second clock generating circuit 25 for generating a clock TCLK, whose phase is adjusted to or synchronized with that of the falling or trailing edge thereof, according to the channel clock. Moreover, similarly as in the case of the first embodiment, A/D converters 5 and 6, a differentiation circuit 7, a comparator 8 and a selector 9 are provided in the signal reproducing device 21.

In the case of using a magneto-optical disk, a sum signal (namely, a signal whose level is proportional to the intensity of reflected light) representing a sum of output reproduction signals of a photo-detector is used for extracting a clock pit, and a difference signal (namely, a signal whose level is proportional to a Kerr angle of rotation on the surface of the disk) representing the difference therebetween is used for reproducing data.

The channel clock reproduced by the PLL circuit 23 is inputted to the clock generating circuits 24 and 25 which generate the clock LCLK, whose phase is adjusted to or synchronized with that of the rising or leading edge of the reproduction signal, and a clock TCLK, whose phase is adjusted to or synchronized with that of the falling or trailing edge thereof, respectively, according to the channel clock, by shifting the phase thereof. The sampling of each of the levels of the reproduction signal respectively corresponding to the leading and trailing edges thereof can be performed with optimum timing by performing an operation similar to that of the first embodiment according to the two clocks LCLK and TCLK.

The phase adjusting or synchronization of the clock is performed in the clock generating circuit 24 or 25 by, for example, always recording a specific pattern at the leading portion of a sector and further sampling the differentiation signal, which is obtained by differentiating the reproduction signal corresponding to the specific pattern, by gradually shifting the phase of the clock, and finally determining a phase, at which the amplitude of the differentiation signal becomes maximal, as the phase of the clock in the sector. The phases of the two clocks can be changed by, for example, varying a delay amount from the original clock reproduced from the clock pit by means of a programmable delay line.

As other methods for adjusting the phase of the clock, there are devised various methods such as that of controlling the phase of each clock at any time in such a manner that the level of a second-order differentiation signal representing a result of the derivative of second order of the reproduction signal becomes zero level.

As above described, in the case of this embodiment, even when data is recorded on an optical disk, which employs the sampled-servo format, by performing the light modulation method and the data is reproduced by performing the PRML method, the sampling of the reproduction signal can be achieved with optimum timing correspondingly to the leading and trailing edges of a mark formed on the disk. Thus a margin at the time of performing the ML decoding later can be increased. Consequently, the recording and reproducing of data can be performed at a higher density by utilizing this margin.

Figure 7:
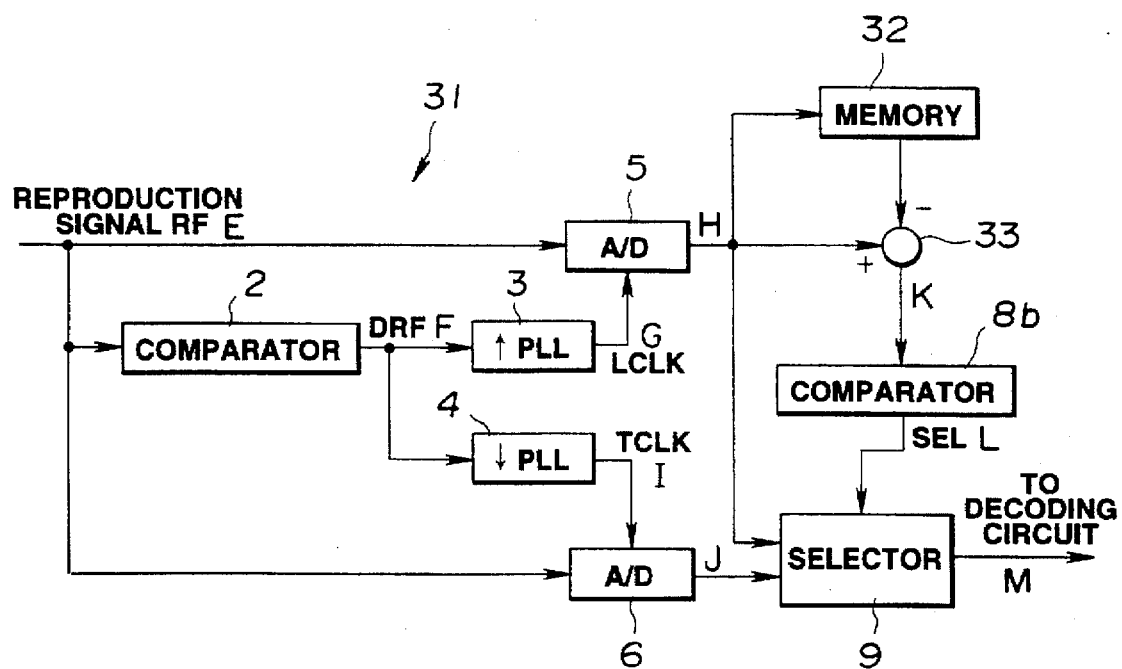
FIG. 7 is a block diagram for illustrating the configuration of a fourth signal reproducing device embodying the present invention, namely, a fourth embodiment of the present invention.

Next, a fourth embodiment of the present invention will be described hereinbelow. FIG. 7 is a block diagram for illustrating the configuration of a signal reproducing device embodying the present invention, namely, the fourth embodiment of the present invention. Further, FIG. 8 is a timing chart for illustrating an operation of the signal reproducing device, namely, the fourth embodiment of the present invention. Incidentally, same reference characters designate same composing elements of the first embodiment of FIG. 1 and thus the description of such composing elements is omitted for brevity of description.

The fourth embodiment utilizes the difference between the resultant values of the A/D conversions performed on the reproduction signal in synchronization with the leading and trailing edges, respectively, when selecting one of such values, differently from the first embodiment which utilizes the differentiation signal obtained by differentiating the reproduction signal.

A signal reproducing device 31 of the fourth embodiment is configured by removing the differentiation circuit 7 from the signal reproducing device 1 of the first embodiment of FIG. 1 and further adding a memory 32, which serves as a storage means, and a subtracter 33, which acts as a computation means, thereto, and moreover, replacing the comparator 8 thereof with a comparator 8b adapted to operate in a manner different from that of the operation of the comparator 8.

In the signal reproducing device having such a configuration, the memory 32 stores the last value obtained by the A/D converter 5 the last time by performing the sampling of the reproduction signal. Further, the subtracter 33 computes the difference between a current value, which is now obtained by the A/D converter 5 by performing the sampling thereof, and the last value stored in the memory 32. Furthermore, the comparator 8b outputs a signal having the level "H" when the result of the subtraction performed by the subtracter 33 is positive, and outputs a signal having the level "L" when the result of the subtraction performed by the subtracter 33 is negative, as output signals SEL.

An operation of the signal reproducing device 31 of the fourth embodiment will be described by referring to FIG. 8. Incidentally, this figure illustrates the operation of the device in the case of using the same original data as used in the first embodiment. Thus, the description of steps common to the operations of the first and fourth embodiments is omitted for simplicity of description.

Similarly as in the case of the first embodiment, the sequence G of clocks LCLK and the sequence I of clocks TCLK of FIG. 8 are generated by the PLL circuits 3 and 4, respectively. Then, results H and J of the A/D conversions are obtained by the A/D converters 5 and 6 according to these clocks, respectively, as illustrated in this figure. At that time, the subtracter 33 performs a subtraction between the last and current values obtained by the A/D converter 5 by performing the sampling of the reproduction signal. Thus, data K of this figure are outputted from the subtracter 33 as a result of the computation. Subsequently, the comparator 8b outputs a signal SEL whose level becomes "H" when the subtracter output K is positive. Thereafter, the selector 9 selects one of the two sequences H and J of the results of the A/D conversions of FIG. 8 according to the output signal SEL of the comparator 8b and further outputs the selected data M as illustrated in this figure.

Namely, when the sampling is performed in the vicinity of the leading edge of a mark, the output of the subtracter 33 becomes positive (namely, maximal). Thus the level of the output signal SEL of the comparator 8b becomes "H". Consequently, an output of the A/D converter 5, which is obtained by performing the sampling according to the clock (LCLK) synchronized with the leading edge of the mark, is selected by the selector 9. Further, when the sampling is performed in the vicinity of the trailing edge of a mark, the output of the subtracter 33 becomes negative (namely, minimal). Thus the level of the output signal SEL of the comparator 8b becomes "L". Consequently, an output of the A/D converter 6, which is obtained by performing the sampling according to the clock (TCLK) synchronized with the trailing edge of the mark, is selected by the selector 9. Thereafter, the result of the A/D conversions of the reproduction signals, which has been selected by the selector 9, is sent to the decoding circuit of the subsequent stage (not shown), whereupon a decoding operation is performed.

Thus, in accordance with this embodiment, there is provided the signal reproducing device which is provided with a memory for storing a previously sampled value of the reproduction signal and performs a subtraction between a currently (or presently) sampled value and the previously sampled value thereof to thereby select one of the results of the A/D conversions, which are respectively sampled in synchronization with the leading and trailing edges of a mark, as data to be used for the decoding. This obviates the necessity of providing an external circuit for differentiating a reproduction signal so as to perform such a selection. Thus, in addition of the advantages of the first embodiment, the fourth embodiment further has advantages in that the simplification of the circuit configuration of the device can be achieved, that the device can dispense with a differentiation circuit which is sensitive to noises and may fail to function normally, and that consequently, the reliability of the device can be enhanced.

Incidentally, in the case of the fourth embodiment, the result of the A/D conversion to be selected is determined according to the difference between the last (or preceding) sampled-value and the current sampled-value. Instead, the computation for the selection may be performed by taking further previously sampled values into consideration. It is, however, preferable for further reducing the size of the circuit to perform such computation by taking only the difference between the current sampled value and the last sampled value or so.

Additionally, the object of the calculation of the difference is not limited to a pair of the last (or previous) and current values, both of which are sampled in synchronization with the leading edge of a mark. For example, a pair of the last and current values, both of which are sampled in synchronization with the trailing edge of a mark may be employed as the object of the calculation of the difference. Alternatively, the difference between a result of the sampling, which is selected by the selector, and another result of the sampling performed in synchronization with one of the leading and trailing edges of a mark may be computed so as to select the result of the sampling to be used for the decoding.

Incidentally, in the foregoing description, there has been described the operation of each of the aforementioned embodiments in the case that a relatively long mark is formed on the disk. However, in the case that a relatively short mark is formed owing to the shortage of power, the relation between the phase of the clock synchronized with the leading edge of the mark and that of the clock synchronized with the trailing edge thereof is merely reversed. The signal reproducing device having the aforementioned configuration can deal with such a case without change in the configuration.

Moreover, in the case of the aforesaid embodiments, the PR(1,1) preceding is employed in performing the PR method. The present invention, however, can be applied to the device even in case of employing another precoding method. For instance, the differentiation signal obtained by differentiating the reproduction signal may be employed as an object, to which the sampling is performed by the A/D converter and the ML coding is carried out. Further, for example, PR(1,0,−1) may be employed as a equalization method. Furthermore, the present invention can be similarly applied to the case of performing a conventional mark edge recording.

Additionally, in the case of the aforementioned embodiment, the reproduction signal is directly inputted to the comparators and then the clocks are generated from outputs of the comparator by using the PLL circuit. Instead of this, a reproduction signal may be inputted to the comparator after noises are eliminated from the reproduction signal through an appropriate filter. Alternatively, instead of placing such a filter just prior to the comparator, clocks may be generated by inputting the reproduction signal RF itself to the filter and further inputting the filtered reproduction signal to both of the A/D converter and the comparator.

Furthermore, a signal to be referred to when selecting one of results of the sampling is not limited to a signal obtained by differentiating the reproduction signal. Signals, whose levels become maximal or minimal at edge portions of a mark, such as a difference signal, may be employed as the signal to be referred to when selecting one of the results of the sampling. Namely, if such signals are employed, a judgement for the selection of the result of the sampling can be performed. Additionally, the determination or detection of the edge portions of a mark may be performed by comparing the level of such a signal with a little offset value, instead of comparing that of such a signal with zero level.

In accordance with the signal reproducing devices of the aforementioned embodiments, the utilization of two independent clock sequences respectively correspondingly to the leading and trailing edges can be realized. Moreover, the present invention has the advantage in that a large capacity optical disk apparatus can be realized at a low cost by combining the light modulation method, by which the configuration of the apparatus can be simplified, with the PRML method, by which data can be recorded and reproduced at a high density, without trading off recording area which a user can use.

Although the preferred embodiments of the present invention have been described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. A signal reproducing device for use in an optical disk apparatus adapted to irradiate an optical disk with light beams and detect a reproduction signal associated with a mark formed on the optical disk from light beams reflected by the optical disk and reproduce data recorded thereon on the basis of the reproduction signal, comprising:

first clock generating means for generating a first clock corresponding to a leading edge of the mark;

second clock generating means for generating a second clock corresponding to a trailing edge of the mark;

first sampling means for sampling the reproduction signal according to the first clock;

second sampling means for sampling the reproduction signal according to the second clock; selection means for selecting one of outputs of the first and second sampling means; and means for performing a maximum likelihood decoding on the one of the outputs selected by said selection means.

2. The signal reproducing device for use in an optical disk apparatus, according to claim 1, which further comprises binarization means for performing binarization of the reproduction signal, wherein the first clock generating means generates a clock in synchronization with a rising edge of an output of the binarization means and the second clock generating means generates a clock in synchronization with a falling edge of an output of the binarization means.

3. The signal reproducing device for use in an optical disk apparatus, according to claim 1, which reproduce data recorded on the optical disk according to a reproduction signal obtained by using a sampled-servo-format disk as the optical disk, wherein the first and second clock generating means generate clocks by shifting phases of channel clocks reproduced on the basis of clock pints formed on the optical disk.

4. The signal reproducing device for use in an optical disk apparatus, according to claim 1, wherein characteristics of the reproduction signal are in accordance with a partial response method.

5. The signal reproducing device for use in an optical disk apparatus, according to claim 1, which further comprises signal detecting means for detecting a signal, whose level becomes maximal or minimal at edge portions of the mark, wherein the selection means operates according to an output of the signal detecting means.

6. The signal reproducing device for use in an optical disk apparatus, according to claim 5, wherein the signal detecting means is operative to differentiate the reproduction signal.

7. The signal reproducing device for use in an optical disk apparatus, according to claim 5, which further comprises storage means for storing sampled-values previously outputted from the first or second sampling means, which include at least a preceding sampled-value outputted from the first or second sampling means last time, wherein the signal detecting means outputs a result of a computation performed on both of a current sampled-value obtained by the first or second sampling means and the sampled-value stored in the storage means.

8. The signal reproducing device for use in an optical disk apparatus, according to claim 7, wherein the signal detecting means outputs a result of a computation performed on both of a current sampled-value obtained by the first or second sampling means and the preceding sampled-value stored in the storage means.

9. A signal reproducing device for use in an optical disk apparatus adapted to irradiate an optical disk with light beams and detect a reproduction signal associated with a mark formed on the optical disk from light beams reflected by the optical disk and reproduce data recorded thereon on the basis of the reproduction signal, comprising:

first clock generating means for generating a first clock corresponding to a leading edge of the mark;

second clock generating means for generating a second clock corresponding to a trailing edge of the mark;

third clock generating means for generating a third clock having a phase which is intermediate between phases of the first and second clocks;

first sampling means for sampling the reproduction signal according to the first clock;

second sampling means for sampling the reproduction signal according to the second clock;

third sampling means for sampling the reproduction signal according to the third clock; and selection means for selecting one of outputs of the first, second and third sampling means.

10. The signal reproducing device for use in an optical disk apparatus, according to claim 9, which further comprises binarization means for performing binarization of the reproduction signal, wherein the first clock generating means generates a clock in synchronization with a rising edge of an output of the binarization means and the second clock generating means generates a clock in synchronization with a falling edge of an output of the binarization means.

11. The signal reproducing device for use in an optical disk apparatus, according to claim 9, which reproduce data recorded on the optical disk according to a reproduction signal obtained by using a sampled-servo-format disk as the optical disk, wherein the first and second clock generating means generate clocks by shifting phases of channel clocks reproduced on the basis of clock pits formed on the optical disk.

12. The signal reproducing device for use in an optical disk apparatus, according to claim 9, wherein characteristics of the reproduction signal are in accordance with a partial response method.

13. The signal reproducing device for use in an optical disk apparatus, according to claim 9, wherein a maximum likelihood decoding is performed on an output sequence of said selection means.

14. The signal reproducing device for use in an optical disk apparatus, according to claim 2, which further comprises signal detecting means for detecting a signal, whose level becomes maximal or minimal at edge portions of the mark, wherein the selection means operates according to an output of the signal detecting means.

15. The signal reproducing device for use in an optical disk apparatus, according to claim 14, wherein the signal detecting means is operative to differentiate the reproduction signal.

16. The signal reproducing device for use in an optical disk apparatus, according to claim 14, which further comprises storage means for storing sampled-values previously outputted from the first or second sampling means, which include at least a preceding sampled-value outputted from the first or second sampling means last time, wherein the signal detecting means outputs a result of a computation performed on both of a current sampled-value obtained by the first or second sampling means and the sampled-value stored in the storage means.

17. The signal reproducing device for use in an optical disk apparatus, according to claim 16, wherein the signal detecting means outputs a result of a computation performed on both of a current sampled-value obtained by the first or second sampling means and the preceding sampled-value stored in the storage means.

18. A signal reproducing device for use in an optical disk apparatus adapted to irradiate an optical disk with light beams and detect a reproduction signal associated with a mark formed on the optical disk from light beams reflected by the optical disk and reproduce data recorded thereon on the basis of the reproduction signal, comprising:

first clock generating means for generating a first clock corresponding to a leading edge of the mark;

second clock generating means for generating a second clock corresponding to a trailing edge of the mark;

third clock generating means for generating a third clock having a phase which is intermediate between phases of the first and second clocks;

first sampling means for sampling the reproduction signal according to the first clock;

second sampling means for sampling the reproduction signal according to the second clock;

third sampling means for sampling the reproduction signal according to the third clock;

selection means for selecting one of outputs of the first, second and third sampling means; and means for performing a maximum likelihood decoding on the one of the outputs selected by said selection means.

* * * * *